(12) United States Patent
Mallary et al.

(10) Patent No.: US 7,230,790 B1
(45) Date of Patent: Jun. 12, 2007

(54) MAGNETIC DISK DRIVE WITH SERVO BURSTS AND ALTERNATING MAGNETIC POLARITY REGIONS THEREBETWEEN

(75) Inventors: Michael Mallary, Sterling, MA (US); Mourad Benakli, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 135 days.

(21) Appl. No.: 11/070,775

(22) Filed: Mar. 2, 2005

Related U.S. Application Data (60) Provisional application No. 60/606,848, filed on Sep. 2, 2004.

(51) Int. Cl.
 *G11B 5/596* (2006.01)
 *G11B 5/09* (2006.01)
(52) U.S. Cl. .................................. 360/77.08; 360/48
(58) Field of Classification Search ............... None
 See application file for complete search history.

(56) References Cited

U.S. PATENT DOCUMENTS

| | | | | |
|---|---|---|---|---|
| 5,923,492 A | | 7/1999 | Liikanen ............ | 360/77.08 |
| 6,025,970 A | * | 2/2000 | Cheung ............. | 360/77.08 |
| 6,157,511 A | * | 12/2000 | Liikanen ............ | 360/77.08 |
| 6,256,160 B1 | | 7/2001 | Liikanen et al. ...... | 360/48 |
| 6,262,859 B1 | * | 7/2001 | Cho .................. | 360/77.08 |
| 6,433,950 B1 | | 8/2002 | Liikanen ............ | 360/77.08 |
| 7,068,461 B1 | * | 6/2006 | Chue et al. .......... | 360/75 |
| 2004/0252394 A1 | * | 12/2004 | Hamaguchi et al. ..... | 360/48 |

* cited by examiner

*Primary Examiner*—William Korzuch
*Assistant Examiner*—Daniell L. Negrón
(74) *Attorney, Agent, or Firm*—Myers Bigel Sibley & Sajovec, PA (57) ABSTRACT

A disk drive includes a data storage disk that has servo information thereon which includes first servo bursts and second servo bursts. The first servo bursts are at least substantially radially aligned with each other, and have low frequency regions therebetween. Adjacent ones of the low frequency regions between the first servo bursts have magnetic polarities that are opposite to one another. The second servo bursts are at least substantially radially aligned with each other and have low frequency regions therebetween. The first and second servo bursts are in a single servo region.

11 Claims, 8 Drawing Sheets

MAGNETIC DISK DRIVE WITH SERVO BURSTS AND ALTERNATING MAGNETIC POLARITY REGIONS THEREBETWEEN

RELATED APPLICATION

This application claims the benefit of and priority to U.S. Provisional Patent Application No. 60/606,848, filed Sep. 2, 2004, the disclosure of which is hereby incorporated herein by reference as if set forth in its entirety.

FIELD OF THE INVENTION

The present invention relates to magnetic storage devices and, more particularly, to magnetic storage devices which employ shielded transducer heads.

BACKGROUND OF THE INVENTION

Manufacturers of disk drives often use magneto-resistive ("MR") transducers (heads) instead of thin-film inductive ("TFI") transducers to perform the disk drive's read functions because of the greater sensitivity of MR transducers over TFI transducers. Due to their sensitivity, however, MR transducers sometimes pickup spurious signals emitted by power transformers, motors and the like.

In an effort to reduce or eliminate the pickup of the aforementioned spurious signals and to flatten the frequency response of the readback signal, disk drive manufactures have placed shields around the MR transducers. Such shields, however, can negatively affect the performance of the MR transducer. Specifically, the shields have been found to be susceptible to variations in their magnetic states. These variations can be magnetically coupled to the MR transducer which can cause unwanted shield-related side readings. The data regions of the magnetic disk may not cause problematic variations in the magnetic state of the shield because the information placed on the disk is written in the data regions in a relatively random fashion. However, the servo regions of the disk have caused problematic magnetic variations in the shields and, hence, problematic shield-related side readings, because the servo-burst patterns are written in a radially coherent manner.

The above-described shield-related side readings may cause, among other things, a bias and/or bit shift in data that is written on a disk, and/or asymmetry and bit shift of a read signal when reading data from the disk, any of which may obscure the data bits. Shield-related side readings may also cause a decrease in the linear range of the MR transducer when reading off-track servo information and a decrease in the off-track signal-to-noise ratio. Furthermore, in extreme cases, the shield-related side readings can cause the disk drive to completely malfunction.

SUMMARY OF THE INVENTION

In some embodiments of the present invention, a data storage disk has servo information thereon that includes first servo bursts and second servo bursts. The first servo bursts are at least substantially radially aligned with each other, and have DC regions therebetween. Adjacent ones of the DC regions between the first servo bursts have magnetic polarities that are opposite to one another. The second servo bursts are at least substantially radially aligned with each other and have DC regions therebetween. The first and second servo bursts are in a single servo region.

In some further embodiments of the present invention, each of the DC regions between the first servo bursts can be circumferentially aligned with, and immediately precede, each of the second servo bursts. Adjacent ones of the DC regions between the second servo bursts can have magnetic polarities that are opposite to one another. Each of the DC regions between the second servo bursts can be circumferentially aligned with, and immediately follow, each of the first servo bursts.

The disk can further include third servo bursts and fourth servo bursts in the same servo region as the first and second servo bursts. The third servo bursts can be at least substantially radially aligned with each other and have DC regions therebetween. Adjacent ones of the DC regions between the third servo bursts can have magnetic polarities that are opposite to one another. The fourth servo bursts can be at least substantially radially aligned with each other and have DC regions therebetween. Adjacent ones of the DC regions between the fourth servo bursts can have magnetic polarities that are opposite to one another.

In some other embodiments of the present invention, the data storage disk has servo information that includes first servo bursts and second servo bursts in a single servo region. The first servo bursts are at least substantially radially aligned with each other, and have DC regions of a first magnetic polarity therebetween. The second servo bursts are at least substantially radially aligned with each other and have DC regions of a second magnetic polarity therebetween, where the first magnetic polarity is opposite to the second magnetic polarity.

In some further embodiments, the disk may also include third servo bursts and fourth servo bursts in the same servo region as the first and second servo bursts. The third servo bursts can be at least substantially radially aligned with each other and have DC regions of the first magnetic polarity therebetween. The fourth servo bursts can be at least substantially radially aligned with each other and have DC regions of the second magnetic polarity therebetween.

In yet some other embodiments of the present invention, the data storage disk has servo information that includes first servo bursts and second servo bursts in a single servo region. The first servo bursts are at least substantially radially aligned with each other, and have low frequency pattern regions therebetween that have a lower frequency than the first servo bursts. Adjacent ones of the low frequency pattern regions between the first servo bursts are about 180° out-of-phase to one another. The second servo bursts are at least substantially radially aligned with each other, and have low frequency pattern regions therebetween that have a lower frequency than the second servo bursts. Adjacent ones of the low frequency pattern regions between the second servo bursts are about 180° out-of-phase to one another.

In some further embodiments, the disk may also include third servo bursts and fourth servo bursts in the same servo region as the first and second servo bursts. The third servo bursts can be at least substantially radially aligned with each other and have low frequency pattern regions therebetween. Adjacent ones of the low frequency pattern regions between the third servo bursts are about 180° out-of-phase to one another, and have a lower frequency than the third servo bursts. The fourth servo bursts can be at least substantially radially aligned with each other and have low frequency pattern regions therebetween. Adjacent ones of the low frequency pattern regions between the fourth servo bursts are about 180° out-of-phase to one another, and have a lower frequency than the fourth servo bursts.

In yet some other embodiments of the present invention, the data storage disk has servo information that includes first servo bursts and second servo bursts in a single servo region. The first servo bursts are at least substantially radially aligned with each other, and have low frequency pattern regions therebetween that have a lower frequency than the first servo bursts. The second servo bursts are at least substantially radially aligned with each other and have low frequency pattern regions therebetween that have a lower frequency than the second servo bursts. The low frequency pattern regions between the first servo bursts are about 180° out-of-phase to the low frequency pattern regions between the second servo bursts.

In some further embodiments, the disk may also include third servo bursts and fourth servo bursts in the same servo region as the first and second servo bursts. The third servo bursts can be at least substantially radially aligned with each other and have low frequency pattern regions therebetween, which have a lower frequency than the third servo bursts. The fourth servo bursts can be at least substantially radially aligned with each other and have low frequency pattern regions therebetween, which have a lower frequency than the fourth servo bursts. The low frequency pattern regions between the third servo bursts are about 180° out-of-phase to the low frequency pattern regions between the fourth servo bursts.

In yet some other embodiments of the present invention, a disk drive includes a rotatable disk, a transducer, and a shield. The disk can include the first, second, third, and/or fourth servo bursts as described in one or more of the embodiments described herein. The transducer is configured to read the first, second, third, and/or fourth servo burst patterns on the disk to generate a servo burst signal. The shield is adjacent to at least two sides of the transducer and spans at least two adjacent ones of the first servo bursts.

The disk drive can include a controller that is configured control positioning of the transducer relative to tracks on the disk based on the servo burst signal, and can be configured to compensate for a change in magnetic bias of the transducer from the opposite magnetic polarities of adjacent ones of the DC regions when reading the servo bursts along different adjacent tracks. When low frequency pattern regions are between the servo bursts, the disk drive can include a filter that is configured to substantially attenuate a contribution of the low frequency pattern regions to the read signal to generate a filtered servo burst signal. The controller may then control positioning of the transducer based on the filtered servo burst signal.

DETAILED DESCRIPTION OF THE INVENTION

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items.

It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied as magnetic disks, servo burst demodulators, and disk drives. Accordingly, the present invention may be embodied in hardware and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of magnetic disks, servo burst demodulators, and disk drives according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
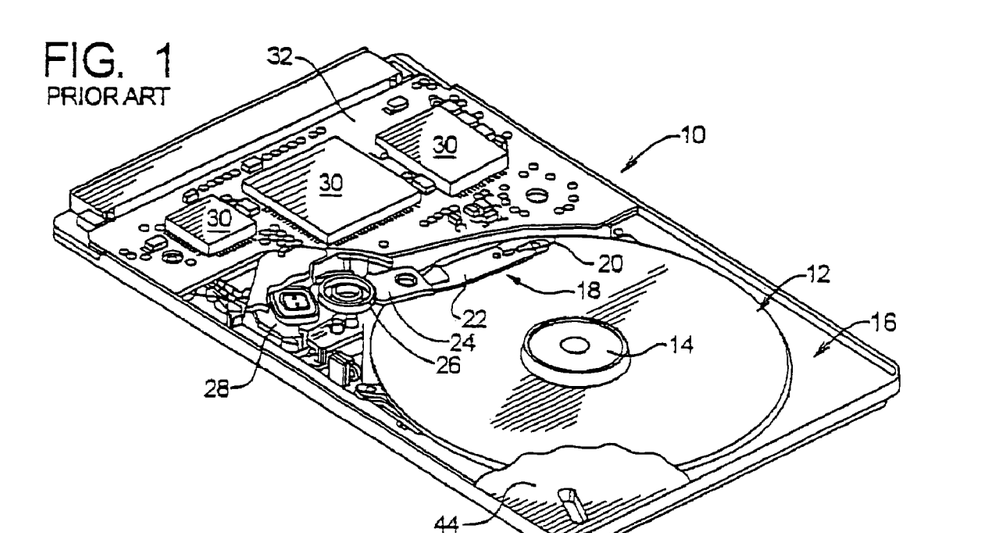
FIG. 1 is a perspective view of a conventional disk drive.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16.

The actuator arm assembly 18 includes a transducer 20 (or head) mounted to a flexure arm 22 which is attached to an actuator arm 24 that can rotate about a pivot bearing assembly 26. The transducer 20 may comprise an MR element or a TFI element. The actuator arm assembly 18 also includes a voice coil motor 28 which moves the transducer 20 relative to the disk 12. The spin motor 14, and actuator arm assembly 18 are coupled to a number of electronic circuits 30 mounted to a printed circuit board 32. The electronic circuits 30 typically include a digital signal processor (DSP), a microprocessor-based controller and a random access memory (RAM) device.

Figure 2:
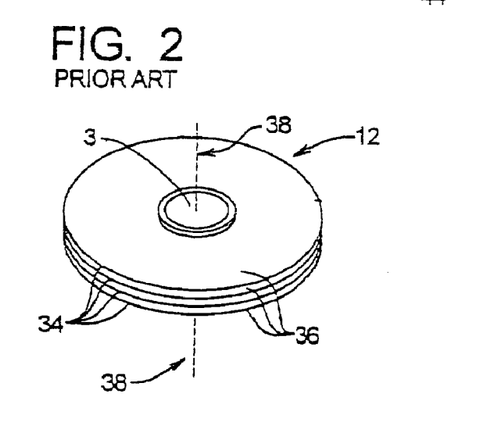
FIG. 2 is a perspective view of a conventional disk stack having a plurality of hard disks.

Referring now to the illustration of FIG. 2, the disk stack 12 typically includes a plurality of disks 34, each of which may have a pair of disk surfaces 36, 36. The disks 34 are mounted on a cylindrical shaft and are designed to rotate about axis 38. The spindle motor 14 as mentioned above, rotates the disk stack 12.

Figure 3:
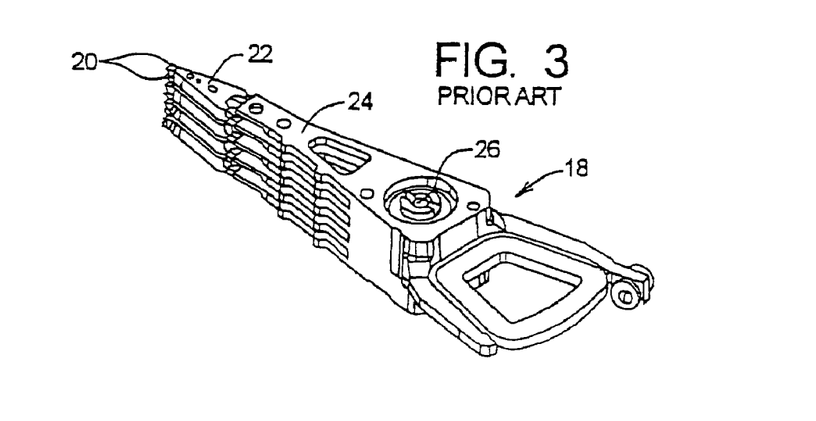
FIG. 3 is a perspective view of a portion of an actuator arm assembly having a plurality of actuator arms.

Referring now to the illustration of FIGS. 1 and 3, the actuator arm assembly 18 includes a plurality of the transducers 20, each of which correspond to one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36.

Figure 4:
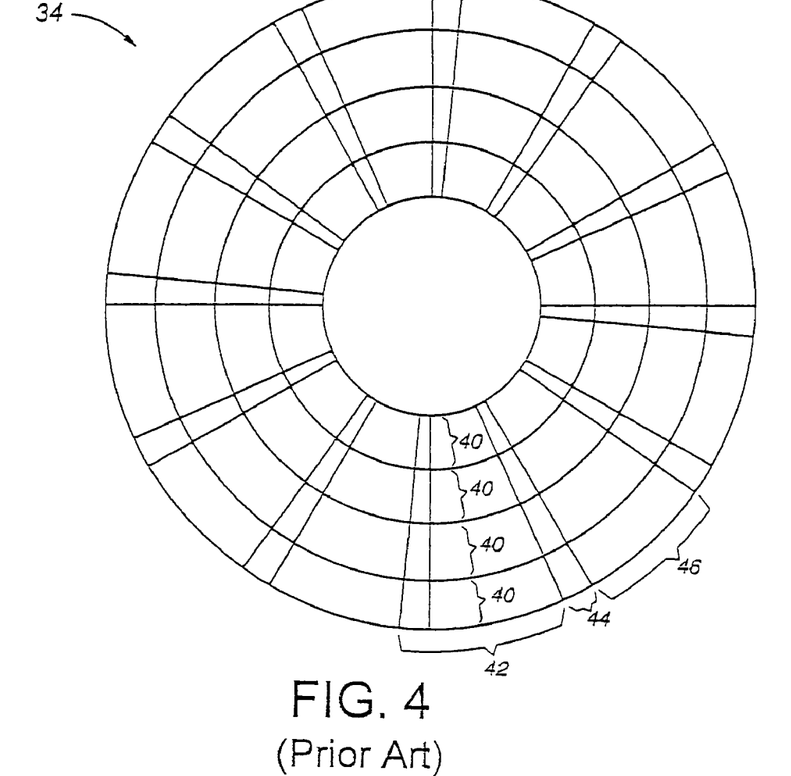
FIG. 4 is a top view of a conventional disk and illustrates tracks and sectors, with each of the sectors being divided into a servo regions and a data regions.

FIG. 4 further illustrates one of the disks 34. Data is stored on the disk 34 within a number of concentric tracks 40 (or cylinders). Each track is divided into a plurality of radially extending sectors 42 on the disk 34. Each sector 42 is further divided into a servo region 44 and a data region 46. The servo regions 44 of the disk 34 are used to, among other things, accurately position the transducer 20 so that data can be properly written onto and read from the disk 34. The data regions 46 are where non-servo related data (i.e., user data) is stored and retrieved. Such data, upon proper conditions, may be overwritten.

Figure 5:
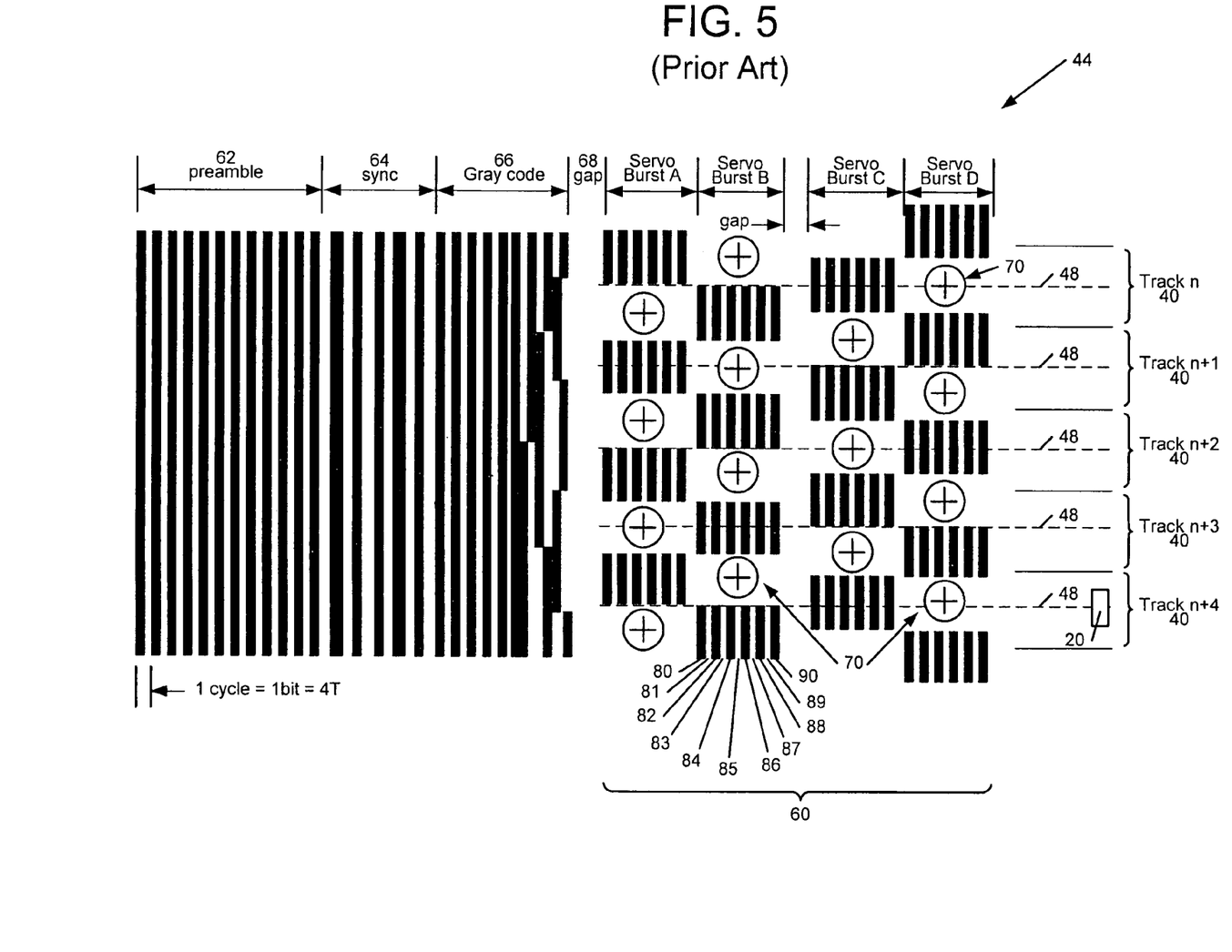
FIG. 5 is a top view of a disk, and illustrates a portion of a conventional servo region.

FIG. 5 illustrates a portion of a conventional servo region 44 that contains servo information which defines tracks 40 at radial locations labeled n to n+4 on the disk 34, which are drawn in a straight, rather than arcuate, fashion for ease of depiction. To accurately write data to and read data from the tracks 40, it is desirable to maintain the transducer 20 in a relatively fixed position with respect to a given track's centerline 48 during each write and read operation (called a track following operation). The width of the data tracks 40 is about 50% greater than the widths of the servo burst patterns 60.

To assist in controlling the position of the transducer 20 relative to the track centerline 48, the servo regions 44 can contain a preamble field 62, a sync field 64, a gray code field 66, a gap 68, and servo burst patterns 60. The preamble field 62 may be configured to allow the disk drive 10 to transition from writing data to reading data. The synchronization field 64 may be configured to allow the disk drive 10 to synchronize a clock so that the gray code can be read and the servo burst patterns 60 can be located. The gray code 66 can be configured to identify the circumferential location of the servo region 44 being read and/or the radial location of the track 40 being read. For purposes of illustration only, the width of one or more of the fields 62, 64, 66, 68, and servo burst patterns 60 may be exaggerated relative to each other. Unlike information in the data regions 46, the servo regions 44 should not be overwritten or erased during normal operation of the disk drive 10.

The servo burst patterns 60 can include one or more groups of servo bursts, as is well-known in the art. An exemplary servo burst pattern 60 that includes first, second, third and fourth servo bursts A, B, C and D, respectively, is shown in FIG. 5. The servo bursts A, B, C, D are accurately positioned relative to each other.

A servo track writer (STW) can be used to write the servo regions 44, including their servo burst patterns 60, onto the surface(s) 36 of the disks 34 during the manufacturing process. The STW controls the transducers 20 corresponding to each disk surface 36 of the disks 34 to write the servo regions 44. As shown in FIG. 5, the transducer 20 may have a width that is about 50% to about 60% of the track width 40. The transducer 20 has been shown misaligned from the track centerline 48 of track n+4 to more clearly illustrate its width.

With reference to track n, the track centerline 48 is defined between the servo bursts A and B. Both servo bursts A and B are immediately adjacent to the centerline 48 of track n. The track centerline 48 passes through the center of the C servo burst. Adjacent ones of the D servo bursts are immediately adjacent to track n.

Additional groups of servo bursts A,B,C,D (i.e., the servo bursts which correspond with tracks n+1 to n+4) are in radial alignment with the respective group of servo bursts A,B,C,D described in connection with track n, as shown in FIG. 5. Accordingly, each one of the A servo bursts are radially aligned with one another, and radially adjacent A servo bursts are spaced apart by the distance of one track width. For example, servo burst A of track n+2 is in radial alignment with servo burst A of track n and is spaced therefrom by the distance of one track width. As used herein, servo bursts are radially aligned when they are aligned in a direction between an outer and inner periphery of the disk. Also as used herein the bursts are circumferentially aligned when they are aligned in a direction along a track on the disk.

Similarly, the B, C and D servo bursts are respectively radially aligned with themselves. Furthermore, radially adjacent B, C and D servo bursts are respectively spaced apart by the distance of one track width. For example, servo burst B of track n+2 is in radial alignment with servo burst B of track n and is spaced therefrom by the distance of one track width. Likewise, the radial alignment and spacing of corresponding servo bursts C and D follow suit.

Each of the servo bursts A,B,C,D includes a plurality of regions of constant magnetization 80-90. Adjacent regions of constant magnetization (e.g., region 80 and region 81) have opposite magnetic polarities (e.g., 180° out of phase from one another). More particularly, the regions of constant magnetization that are shown as black lines (e.g., 80, 82, 84, 86, 88, and 90) have a first magnetic polarity, and the regions shown as white spaces/lines (e.g., 81, 83, 85, 87, and 89) have a second magnetic polarity that is opposite to the first polarity. Each of the regions between the servo bursts A,B,C,D have the same magnetic polarity (illustrated as "+"), and are referenced in FIG. 5 as direct current (DC) regions 70.

With reference to FIGS. 1-5, as the transducer 20 is moved along one of the tracks 40, it reads the servo information contained in the servo regions 44 of the track 40, one servo region 44 at a time around the disk 34. The servo information is used to generate a position error signal (PES) as a function of the misalignment between the transducer 20 and the track centerline 48. The PES signal is input to a servo control loop (within the electronic circuits 30) which performs calculations and outputs a servo compensation signal which controls the VCM 28 to, ideally, place the transducer 20 at the desired position relative to the data track centerline 48.

When the transducer 20 is positioned exactly over the centerline 48 of track n, about 45% of the A servo burst will be read (assuming the transducer 20 is one-half the track width) followed by about 45% of the B servo burst, and their amplitudes will be equal. As the transducer 20 moves off-track (i.e., off of the track centerline), the amplitude of one burst will increase while the amplitude of the other burst will decrease, depending on the direction of misalignment.

Similarly, if the transducer 20 is positioned exactly one-half track below the centerline of track n (along the interface of track n and n+1), about 45% of the C servo burst will be read followed by about 45% of the D servo burst. As the transducer 20 moves off of the interface of track n and track n+1, the amplitude of either the C servo burst or the D servo burst will increase while the other will decrease, depending on the direction in which the head moved. Accordingly, the PES can be derived from the relative amplitudes of the A, B, C and D servo bursts by detecting the readout from the transducer 20 as it passes over the servo bursts, and determining the difference in amplitude between the servo burst pair A and B and the servo burst pair C and D.

Figure 6:
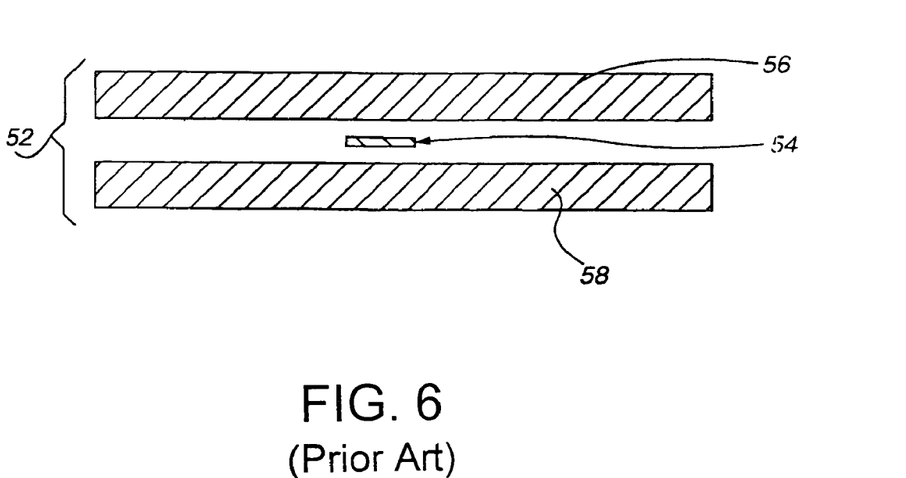
FIG. 6 is a block diagram of a conventional MR transducer.

FIG. 6 shows a conventional MR transducer 52 which may be included in the transducer 20 shown in FIG. 1. The MR transducer 52 includes, among other things, an MR element 54 sandwiched between first and second shields 56, 58. As illustrated in the figure (which is not to scale), the first and second shields 56,58 are much larger than the size of the MR element 54. The shields 56,58 may, for example, span from 3000 to 6000 tracks on either side of the MR element 54. Accordingly, each of the first and second shields 56,58 may, for example, span at least 6000 to 12000 tracks. In contrast, as mentioned above, the MR element 54 generally has a width of about 60% of one of the tracks 40 (although other MR element widths may be used in accordance with various embodiments of the present invention).

As mentioned in the background of the invention section, the first and second shields 56,58 can be susceptible to variations in their magnetic states. These variations can magnetically couple to the MR element 54 and cause unwanted shield-related side readings. The data regions 46 of the magnetic disk 34 may not cause problematic variations in the magnetic state of the shields 56,58, because, for example, the data stored in the data regions 46 generally has a relatively random magnetic polarity pattern. Consequently, the positive and negative magnetic cycles of the data in the data regions 46 tend to cancel each other out.

However, in the servo regions 44, each of the DC regions 70 has the same magnetic polarity (e.g., "+"). Consequently, when the shields 56,58 span a plurality of the DC regions 70 while reading the servo bursts A,B,C,D, the same polarity magnetic fields from the DC regions 70 can induce variations in the magnetic states of the shields 56,58. These variations may magnetically couple to the MR element 54 and result in undesirable shield-related side readings, such as while reading data from the disk 34 via the MR element 54.

Figure 7:
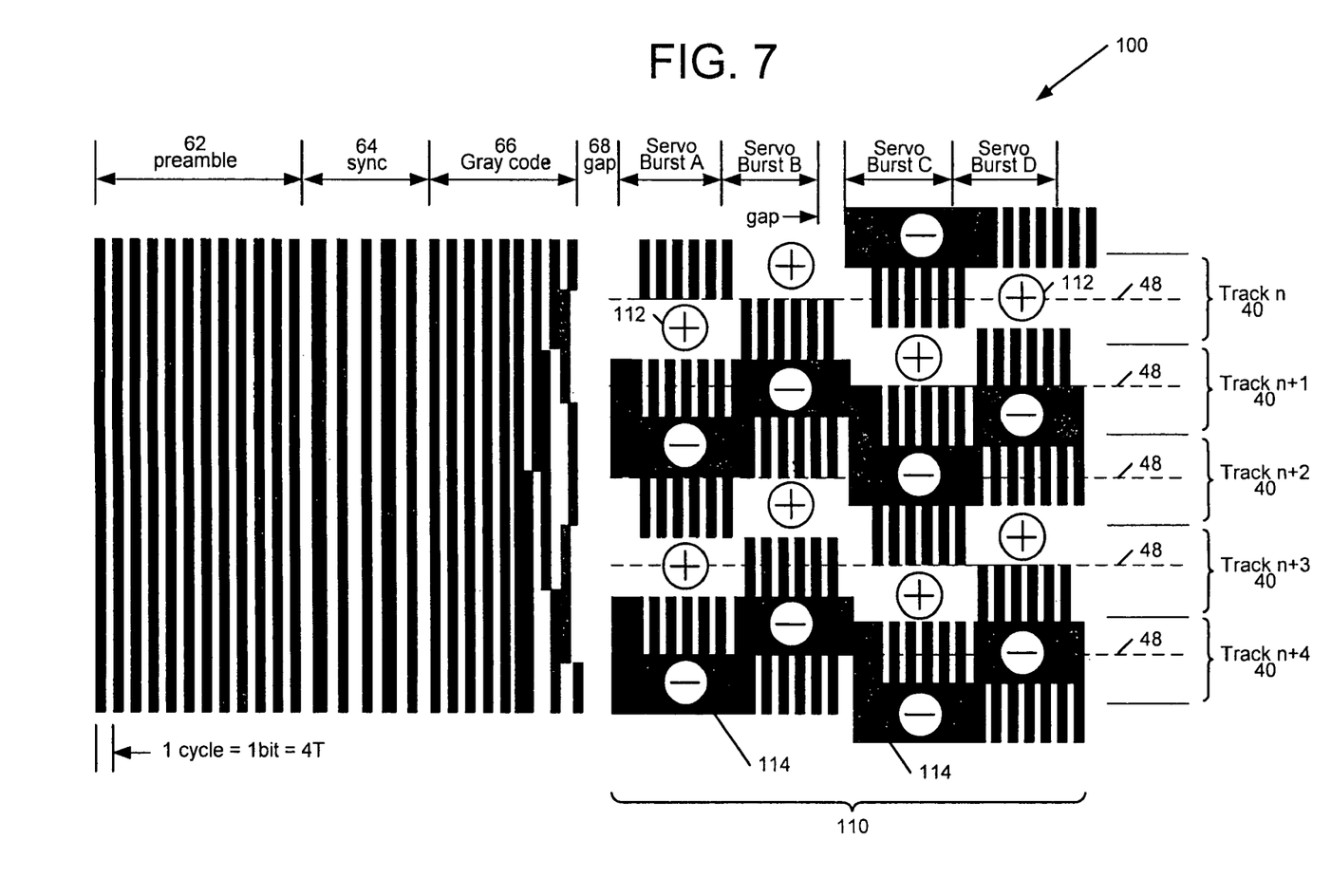
FIG. 7 is a top view of a disk, and illustrates a portion of a servo region in accordance with some embodiments of the present invention.

FIG. 7 illustrates a portion of a servo region 100 containing servo information, in accordance with some embodiments of the present invention, which may be used in the servo regions 44 on the disk 34 shown in FIG. 4. As with the servo region that is shown in FIG. 5, the servo region 100 of FIG. 7 defines a plurality of concentric tracks 40 on the disk 34, a portion of which are shown at radial locations labeled n to n+4, and which are drawn in a straight, rather than arcuate, fashion for ease of depiction.

The servo region 100 can include the preamble field 62, sync field 64, gray code field 66, gap 68 that were shown and described with regard to the servo region shown in FIG. 5. The servo region 100 has servo burst patterns 110 that are different than the servo burst patterns 60 that are shown in FIG. 5. The servo burst patterns 110 include A,B,C,D servo bursts and DC fields therebetween that have alternate in magnetic polarity.

More particularly, the A servo burst patterns are radially aligned with each other and have two different alternating opposite magnetic polarity DC regions 112, 114 therebetween. The DC regions 112 have a first magnetic polarity (shown as "+"), and the DC regions 114 have a second magnetic polarity (shown as "−") that is opposite to the first magnetic polarity "+". As shown, the DC regions between the A servo bursts alternate between the first magnetic polarity of the DC region 112 and the second magnetic polarity of the other DC region 114. Accordingly, radially adjacent ones of the DC regions have opposite magnetic polarities.

The B servo bursts can similarly include DC regions therebetween that alternate between the first magnetic polarity of the DC region 112 and the second magnetic polarity of the other DC region 114. Likewise, the C servo bursts and the D servo bursts can each include DC regions therebetween that alternate between the first magnetic polarity of the DC region 112 and the second magnetic polarity of the other DC region 114, such as shown in FIG. 7.

As shown in FIG. 7, the DC regions between the A servo bursts are each circumferentially aligned with, and immediately precede, each of the B servo bursts. The DC regions between the B servo bursts are each circumferentially aligned with, and immediately follow, each of the A servo bursts. The DC regions between the C servo bursts are each circumferentially aligned with, and immediately precede, each of the D servo bursts. The DC regions between the D servo bursts are each circumferentially aligned with, and immediately follow, each of the C servo bursts.

Because the servo burst patterns A,B,C,D each have alternating opposite magnetic polarity DC regions 112, 114, when the MR element 54 (FIG. 6) is moved along a track centerline 48 to read the servo bursts A,B,C,D, the first and second shields 56, 58 (FIG. 6) are simultaneously exposed to opposite magnetic polarity fields from the DC regions 112, 114. For example, if the shields 56,58 radially extend over eight of the DC regions, then they would be simultaneously exposed to the opposite magnetic polarity fields of four of the DC regions 112 and four of the DC regions 114. The opposite magnetic polarity fields from the DC regions 112 and 114 may substantially cancel each other so that the magnetic state of the shields 56, 58 is substantially unaffected by the DC regions 112,114. Consequently, the radially alternating DC regions 112, 114 with their opposite magnetic polarities may avoid undesirable shield-related side reading effects on the MR element 54.

Figure 8:
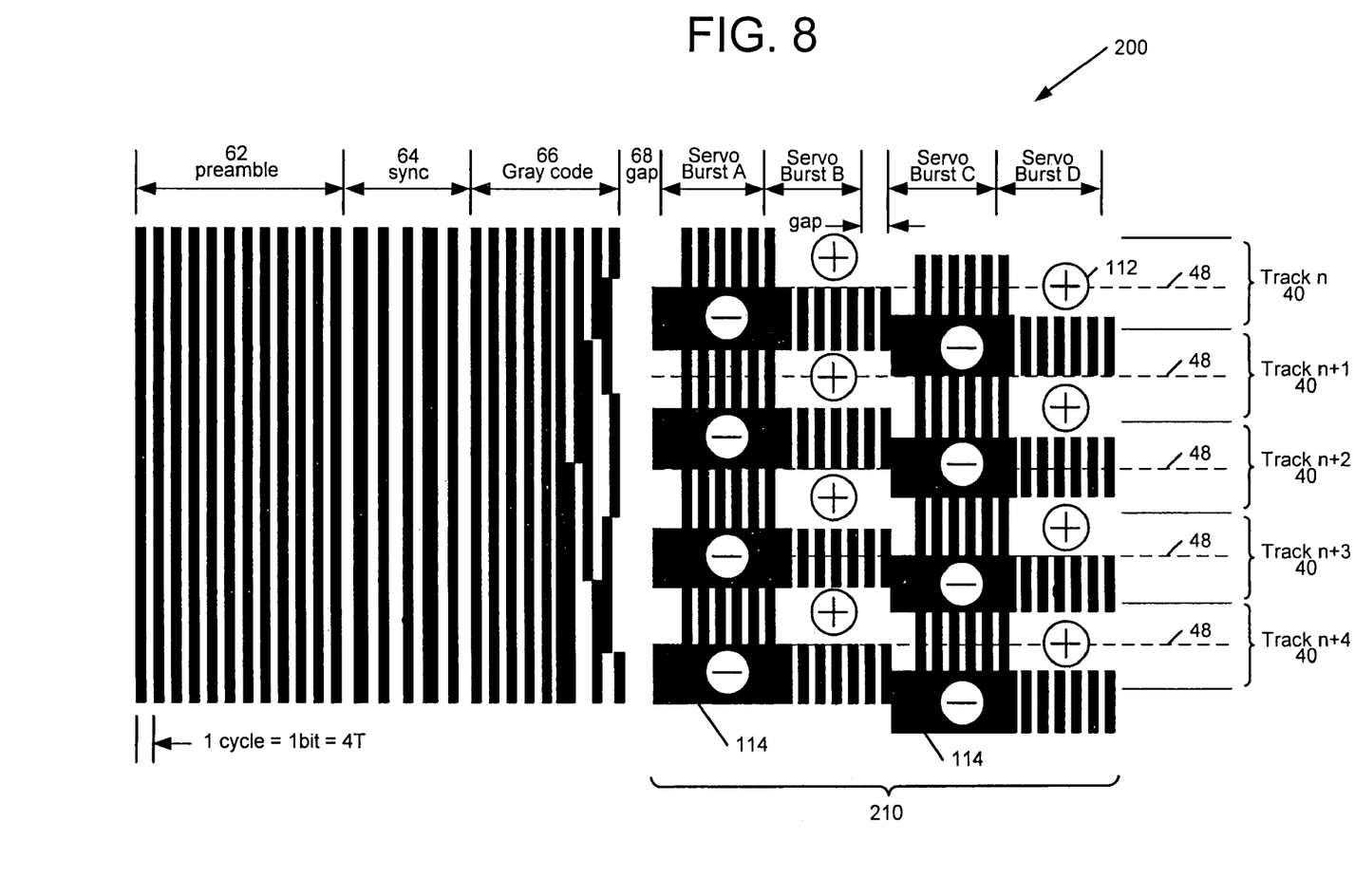
FIG. 8 is a top view of a disk, and illustrates a portion of a servo region in accordance with some other embodiments of the present invention.

FIG. 8 illustrates a portion of a servo region 200 containing servo information, in accordance with some other embodiments of the present invention, which may be used in the servo regions 44 on the disk 34 shown in FIG. 4. As with the servo region 100 that is shown in FIG. 7, the servo region 200 of FIG. 8 defines a plurality of concentric tracks 40 on the disk 34, a portion of which are shown at radial locations labeled n to n+4, and which are drawn in a straight, rather than arcuate, fashion for ease of depiction.

The servo region 200 can include the preamble field 62, sync field 64, gray code field 66, and gap 68 that were shown and described with regard to the servo region shown in FIG. 5. The servo region 200 has servo burst patterns 210 that have different placement of the DC regions 112 and 114. The magnetic polarities of the DC regions alternate between opposite polarities in a circumferential direction along the tracks 40 in the servo burst patterns 210, instead of alternating in a radially direction as shown in FIG. 7. More particularly, the A servo bursts have the DC regions 114 therebetween, the B servo bursts have the DC regions 112 therebetween, the C servo bursts have the DC regions 114 therebetween, and the D servo bursts have the DC regions 112 therebetween.

The DC regions 112,114 have opposite magnetic polarities (shown as "+" and "−"), as was discussed with regard to FIG. 7. The magnetic polarities ("+" and "−") that are shown in FIGS. 7 and 8 are only used to distinguish one of the types of DC regions 112,114 from the other type of the DC regions 112,114. Thus, the DC regions 112 may have either magnetic polarity, with the other DC regions 114 have the opposite magnetic polarity.

As shown in FIG. 8, the DC regions between the A servo bursts are each circumferentially aligned with, and immediately precede, each of the B servo bursts. The DC regions between the B servo bursts are each circumferentially aligned with, and immediately follow, each of the A servo bursts. The DC regions between the C servo bursts are each circumferentially aligned with, and immediately precede, each of the D servo bursts. The DC regions between the D servo bursts are each circumferentially aligned with, and immediately follow, each of the C servo bursts.

The first and second shields 56, 58 (FIG. 6) may have sufficient thickness so that they extend across two or more of the servo bursts A,B,C,D while the MR element 54 is moved along a track centerline 48 to read the servo bursts A,B,C,D. Because the magnetic polarity of the DC regions 112, 114 alternate in a circumferential direction between the servo bursts A,B,C,D, the first and second shields 56, 58 may be simultaneously exposed to opposite magnetic polarity fields from the DC regions 112, 114.

For example, if the shields 56,58 can extend in a circumferential direction over servo bursts A and B, then as they each pass over the servo bursts A and B, the each of the shields 56,58 may be simultaneously exposed to the opposite magnetic polarity fields of the DC regions 112, 114 between the read servo bursts A and B. The opposite magnetic polarity fields from the DC regions 112 and 114 may substantially cancel each other so that the magnetic state of the shields 56, 58 is substantially unaffected by the DC regions 112,114. Consequently, the circumferentially alternating DC regions 112, 114 with their opposite magnetic polarities may avoid undesirable shield-related side reading effects on the MR element 54.

Figure 9:
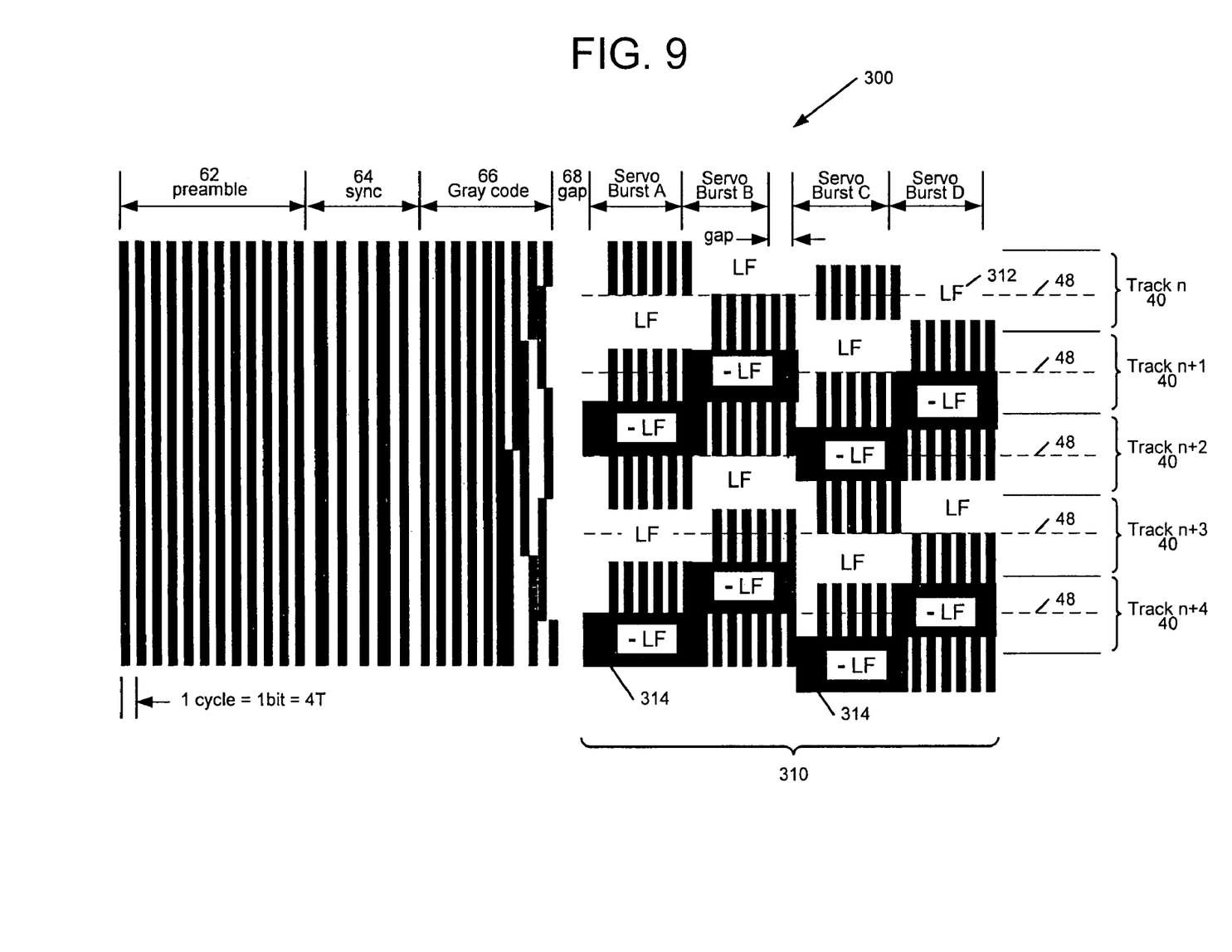
FIG. 9 is a top view of a disk, and illustrates a portion of a servo region in accordance with some other embodiments of the present invention.

FIG. 9 illustrates a portion of a servo region 300 containing servo information, in accordance with some other embodiments of the present invention, which may be used in the servo regions 44 on the disk 34 shown in FIG. 4. As with the servo region 100 that is shown in FIG. 7, the servo region 300 of FIG. 9 defines a plurality of concentric tracks 40 on the disk 34, a portion of which are shown at radial locations labeled n to n+4, and which are drawn in a straight, rather than arcuate, fashion for ease of depiction.

The servo region 300 can include the preamble field 62, sync field 64, gray code field 66, and gap 68 that were shown and described with regard to the servo region shown in FIG. 5, along with a servo burst pattern 310. The servo burst pattern 310 is similar to the servo burst pattern 110 that is shown in FIG. 7, except that the DC regions 112 and DC regions 114 have been respectively replaced by two different types of low frequency pattern regions 312 and 314, which are respectively shown as "LF" and "−LF". The two types of low frequency pattern regions 312 and 314 can be about 180° out-of-phase to one another. Accordingly, radially adjacent ones of the low frequency pattern regions 312, 314 may be 180° out-of-phase to each other. In one embodiment of the present invention, the LF pattern may consist of only two constant magnetization regions of equal length and opposite polarity so that the net magnetization therefrom is effectively nulled.

Each of the low frequency pattern regions 312, 314 includes a plurality of regions of constant magnetization. Adjacent regions have opposite magnetic polarities. The low frequency pattern regions 312, 314 have a lower frequency, and may have a substantially lower frequency, than each of the servo bursts A,B,C,D. The low frequency pattern regions 312, 314 should have a sufficiently low frequency compared to the each of the servo bursts A,B,C,D so their contributions to the read signal can be substantially attenuated relative to the contributions from the servo bursts A,B,C,D. For example, each of the low frequency pattern regions 312, 314 may have regions of constant magnetization that have a sufficient width to provide from two to four magnetic polarity transitions in that region along a track. Such attenuation of the contributions of the low frequency pattern regions 312, 314 to the read signal may be carried out by a matched filter as will be further described below. When the radially adjacent ones of the low frequency pattern regions 312, 314 are 180° out-of-phase to each other, the regions of constant magnetization in the adjacent regions 312,314 can have opposite magnetic polarities.

When the MR element 54 (FIG. 6) is moved along a track centerline 48 to read the servo bursts A,B,C,D, the first and second shields 56, 58 (FIG. 6) are simultaneously exposed to opposite magnetic polarity fields from the alternating regions of the adjacent low frequency pattern regions 312, 314. The opposite magnetic polarity fields from the low frequency pattern regions 312, 314 may substantially cancel each other so that magnetic state of the shields 56, 58 is substantially unaffected by the low frequency pattern regions 312, 314. Consequently, the radially alternating low frequency pattern regions 312, 314 may avoid undesirable shield-related side reading effects on the MR element 54.

Figure 10:
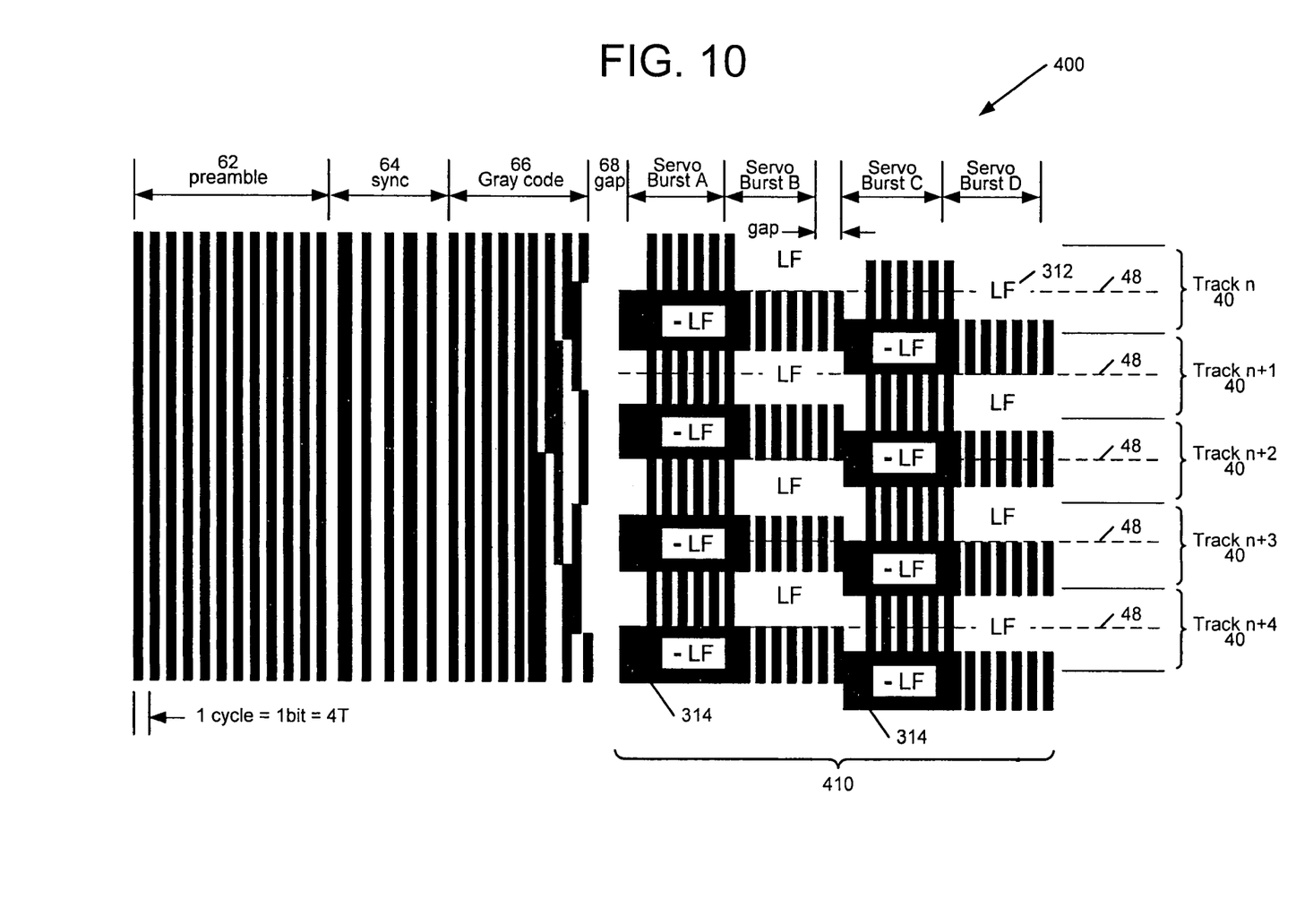
FIG. 10 is a top view of a disk, and illustrates a portion of a servo region in accordance with yet some other embodiments of the present invention.

FIG. 10 illustrates a portion of a servo region 400 containing servo information, in accordance with some other embodiments of the present invention, which may be used in the servo regions 44 on the disk 34 shown in FIG. 4. As with the servo region 100 that is shown in FIG. 7, the servo region 400 of FIG. 10 defines a plurality of concentric tracks 40 on the disk 34, a portion of which are shown at radial locations labeled n to n+4, and which are drawn in a straight, rather than arcuate, fashion for ease of depiction.

The servo region 400 can include the preamble field 62, sync field 64, gray code field 66, and gap 68 that were shown and described with regard to the servo region shown in FIG.

5, along with a servo burst pattern 410. The servo burst pattern 410 is similar to the servo burst pattern 210 that is shown in FIG. 8, except that the DC regions 112 and DC regions 114 have been respectively replaced by the low frequency pattern regions 312 and 314. The low frequency pattern regions 312,314 can be configured, with respect to their frequency and regions of constant magnetization, as was described with regard to FIG. 9.

When the first and second shields 56, 58 (FIG. 6) have sufficient thickness so that they extend across two or more of the servo bursts A,B,C,D while the MR element 54 (FIG. 6) is moved along a track centerline 48 to read the servo bursts A,B,C,D, the first and second shields 56, 58 (FIG. 6) are simultaneously exposed to opposite magnetic polarity fields from the circumferentially alternating low frequency pattern regions 312, 314. The opposite magnetic polarity fields from the low frequency pattern regions 312, 314 may substantially cancel each other so that magnetic state of the shields 56, 58 is substantially unaffected by the low frequency pattern regions 312, 314. Consequently, the circumferentially alternating low frequency pattern regions 312, 314 may avoid undesirable shield-related side reading effects on the MR element 54.

Figure 11:
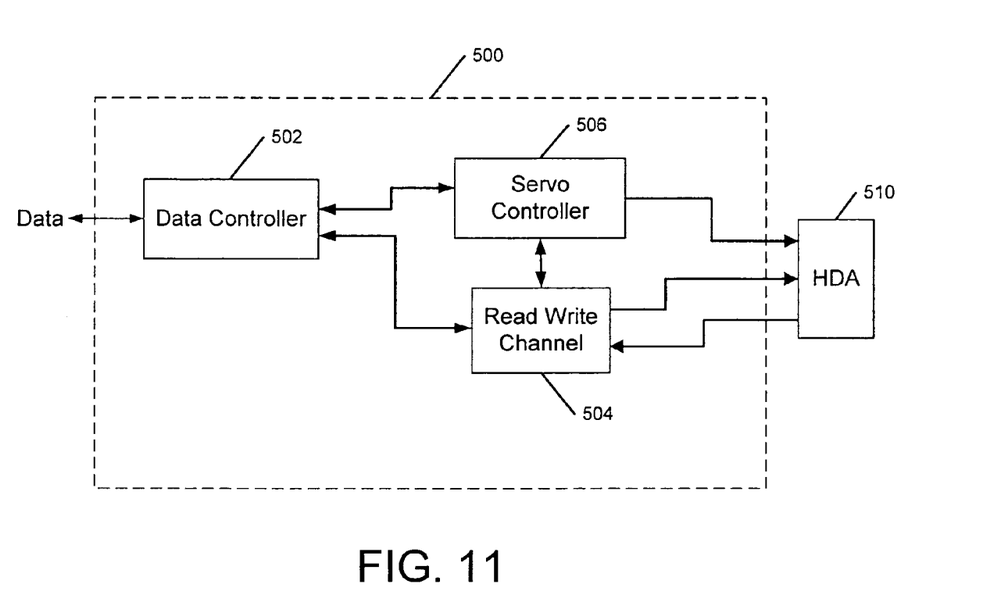
FIG. 11 is a block diagram of electronic circuits of a disk drive, such as disk drive shown in FIG. 1, that are configured in accordance with some embodiments of the present invention.

FIG. 11 is a block diagram of electronic circuits 500 that are configured to position the MR element 54 based on servo burst patterns in servo regions, in accordance with various embodiments of the present invention. The electronic circuits 500, which may be included within the electronic circuits 30 of the disk drive 10 (FIG. 1), include a data controller 502, a read/write channel 504, and a servo controller 906, which communicate with a head disk assembly 510 (i.e., actuator arm assembly 18, VCM 28, and disk stack 12 of FIG. 1) to seek to and follow tracks 40 on the disks 34, and to read/write from the tracks 40 thereon. The servo controller 506 is configured to operate in accordance with various embodiments of the present invention.

The data controller 502 can operate in a conventional manner to format data communicated between a host computer, or other external device, and the disks 34 through the read/write channel 504. The read/write channel 504 can operate in a conventional manner to convert data between the digital form used by the data controller 502 and the analog form used by the transducer 20, including the MR element 54. The read/write channel 504 also provides servo positional information read from the disks 34 to the servo controller 506. Transducer location information that is generated by the MR element 54 reading the servo preambles and servo burst patterns is transferred to the servo controller 506, which uses it to perform seek and track following operations of the transducer 20 relative to data tracks 40.

In some embodiments of the present invention, the servo controller 506 is configured to compensate for the effects of the opposite magnetic polarities that are encountered in the DC regions 112, 114 of FIGS. 7 and 8 as the MR element 54 reads the servo bursts A,B,C,D along different tracks 40. For example, with regard FIG. 7, when the MR element 54 travels along a centerline 48 of track n and reads a portion of the A servo burst, the read signal is biased by the DC region 112. In contrast, when the MR element 54 travels along a centerline 48 of track n+2 and reads a portion of the A servo burst, the read signal is biased by the DC region 114, which oppositely biases the MR element 54 compared to the DC region 112 when on track n. Consequently, the MR element 54 is biased in opposite directions when reading a corresponding one of the servo bursts A,B,C,D on different radial tracks.

Accordingly, the servo controller 506 may determine the radial location of a data track 40 that is to be followed, and, based on the radial location, it may compensate for the affect of magnetic bias from the DC regions 112,114 on the read signal when reading the servo bursts A,B,C,D. The servo controller 506 can include a table or other data repository that provides an indication of the locations of the DC regions 112, 114 so compensation can be performed to remove the effects of magnetic bias in the reading of the servo bursts A,B,C,D.

Figure 12:
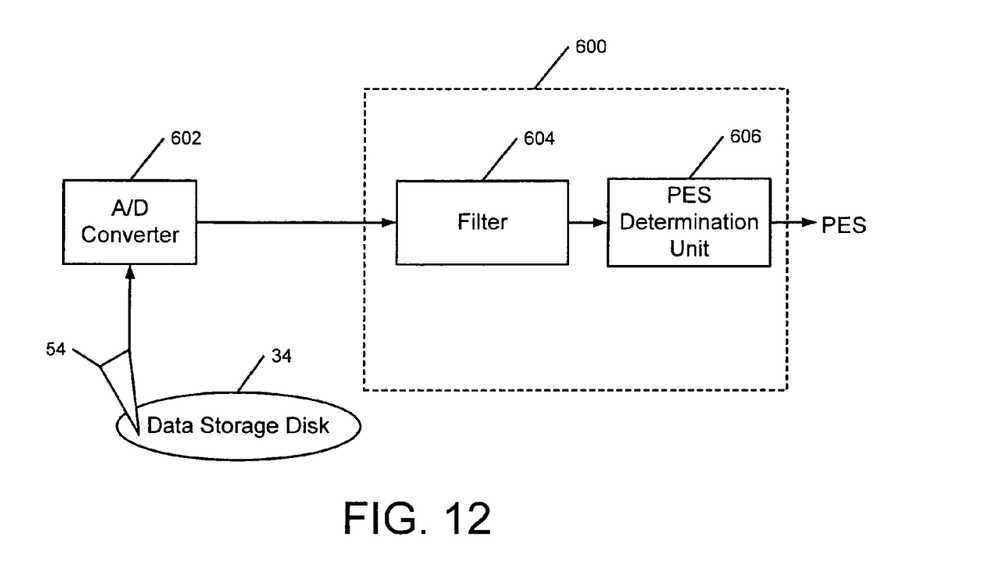
FIG. 12 is a block diagram of a servo burst demodulator, in accordance with some embodiments of the present invention, which may be used in the servo controller of FIG. 11.

FIG. 12 is a block diagram of a servo burst demodulator 600 that may be at least partially within, for example, the servo controller 506 and/or the read write channel 504. The MR element 54 reads the servo burst patterns on the disk 34 to generate the read signal. The read signal may be converted to a digital signal by an analog-to-digital converter 602, provided to a filter 604, and then provided to a PES determination unit 606 that determines PES based on the servo bursts A,B,C,D.

When low frequency pattern regions are provided between the servo bursts A,B,C,D, such as was explained and shown with regard to FIGS. 9 and 10 (i.e., regions 312,314), the read signal can include a contribution from the low frequency pattern regions. In accordance with some embodiments of the present invention, the filter 604 is configured to substantially attenuate a contribution of the low frequency pattern regions to the read signal to generate a filtered servo burst signal. The filter 604 may be a low pass filter that is configured to substantially attenuate read signal frequencies below about the frequency of the signal contribution from the low frequency pattern regions. The filter 604 may additionally, or alternatively, be a matched filter that is configured to substantially attenuate read signal frequencies in the particular range of the low frequency pattern regions.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A data storage disk having servo information thereon, the servo information comprising:
   a plurality of first servo bursts that are at least substantially radially aligned with each other and have low frequency pattern regions therebetween, wherein adjacent ones of the low frequency pattern regions between the first servo bursts are about 180° out-of-phase to one another, and have a lower frequency than the first servo bursts;
   a plurality of second servo bursts that are at least substantially radially aligned with each other and have low frequency pattern regions therebetween, wherein adjacent ones of the low frequency pattern regions between the second servo bursts are about 180° out-of-phase to one another, and have a lower frequency than the second servo bursts, and the first and second servo bursts are in a single servo region.

2. The disk of claim 1, wherein:
   the low frequency pattern regions between the first servo bursts have no more than four polarity transitions; and
   the low frequency pattern regions between the second servo bursts have no more than four polarity transitions.

3. The disk of claim 1, wherein:
- each of the low frequency pattern regions between the first servo bursts are circumferentially aligned with, and immediately precede, each of the second servo bursts; and
- each of the low frequency pattern regions between the second servo bursts are circumferentially aligned with, and immediately follow, each of the first servo bursts.

4. The disk of claim 1, further comprising:
- third servo bursts that are at least substantially radially aligned with each other and have low frequency pattern regions therebetween, wherein adjacent ones of the low frequency pattern regions between the third servo bursts are about 180° out-of-phase to one another, and have a lower frequency than the third servo bursts; and
- fourth servo bursts that are at least substantially radially aligned with each other and have low frequency pattern regions therebetween, wherein adjacent ones of the low frequency pattern regions between the fourth servo bursts are about 180° out-of-phase to one another, and have a lower frequency than the fourth servo bursts, and the third and fourth servo bursts are in the same servo region as the first and second servo bursts.

5. The disk of claim 4, wherein:
- each of the low frequency pattern regions between the third servo bursts are circumferentially aligned with, and immediately precede, each of the fourth servo bursts; and
- each of the low frequency pattern regions between the fourth servo bursts are circumferentially aligned with, and immediately follow, each of the third servo bursts.

6. A data storage disk having servo information thereon, the servo information comprising:
- a plurality of first servo bursts that are at least substantially radially aligned with each other and have low frequency pattern regions therebetween that have a lower frequency than the first servo bursts;
- a plurality of second servo bursts that are at least substantially radially aligned with each other and have low frequency pattern regions therebetween that have a lower frequency than the second servo bursts, wherein the low frequency pattern regions between the first servo bursts are about in-phase to one another and are about 180° out-of-phase to the low frequency pattern regions between the second servo bursts, and the first and second servo bursts are in a single servo region.

7. The disk of claim 6, wherein:
- each of the low frequency pattern regions between the first servo bursts are circumferentially aligned with, and immediately precede, each of the second servo bursts; and
- each of the low frequency pattern regions between the second servo bursts are circumferentially aligned with, and immediately follow, each of the first servo bursts.

8. The disk of claim 7, further comprising:
- third servo bursts that are at least substantially radially aligned with each other and have low frequency pattern regions therebetween that have a lower frequency than the third servo bursts; and
- fourth servo bursts that are at least substantially radially aligned with each other and have low frequency pattern regions therebetween that have a lower frequency than the fourth servo bursts, wherein the low frequency pattern regions between the third servo bursts are about 180° out-of-phase to the low frequency pattern regions between the fourth servo bursts.

9. A disk drive comprising:
- a data storage disk, wherein the disk comprises a plurality of first servo bursts that are at least substantially radially aligned with each other and have low frequency pattern regions therebetween, wherein adjacent ones of the low frequency pattern regions between the first servo bursts are about 180° out-of-phase to one another, and have a lower frequency than the first servo bursts, and the disk comprises a plurality of second servo bursts that are at least substantially radially aligned with each other and have low frequency pattern regions therebetween, wherein adjacent ones of the low frequency pattern regions between the second servo bursts are about 180° out-of-phase to one another, and have a lower frequency than the second servo bursts, and the first and second servo bursts are in a single servo region;
- a transducer that is configured to read the first and second servo bursts on the disk to generate a servo burst signal;
- a shield that is adjacent to at least two sides of the transducer and that spans at least two adjacent ones of the first servo bursts;
- a filter that is configured to substantially attenuate a contribution of the low frequency pattern regions to the read signal to generate a filtered servo burst signal; and
- a controller that is configured to control positioning of the transducer relative to tracks on the disk based on the filtered servo burst signal.

10. The disk drive of claim 9, wherein the low frequency pattern regions between the first servo bursts and between the second servo burst are configured to reduce magnetic bias in the shield when the transducer is reading the first and second servo bursts.

11. A disk drive comprising:
- a data storage disk, wherein the disk comprises a plurality of first servo bursts that are at least substantially radially aligned with each other and have low frequency pattern regions therebetween which have a lower frequency than the first servo bursts, and comprises a plurality of second servo bursts that are at least substantially radially aligned with each other and have low frequency pattern regions therebetween which have a lower frequency than the second servo bursts, wherein the low frequency pattern regions between the first servo bursts are about 180° out-of-phase to the low frequency pattern regions between the second servo bursts, and the first and second servo bursts are in a single servo region;
- a transducer that is configured to read the first and second servo bursts on the disk to generate a servo burst signal;
- a shield that is adjacent to at least two sides of the transducer and that spans at least two adjacent ones of the first servo bursts; and
- a controller that is configured to control positioning of the transducer relative to tracks on the disk based on the servo burst signal.

* * * * *

UNITED STATES PATENT AND TRADEMARK OFFICE
CERTIFICATE OF CORRECTION

PATENT NO. : 7,230,790 B1
APPLICATION NO. : 11/070775
DATED : June 12, 2007
INVENTOR(S) : Mallary et al.

Page 1 of 1

It is certified that error appears in the above-identified patent and that said Letters Patent is hereby corrected as shown below:

In The Claims:

Column 14, Claim 11, Line 49:  Please insert after "about"
--in-phase to one another and are about--

Signed and Sealed this

Fourteenth Day of August, 2007

JON W. DUDAS
*Director of the United States Patent and Trademark Office*